Nov. 15, 1949     A. V. TERRY     2,487,904
CYCLE SADDLE SPRING MOUNTING
Filed Feb. 2, 1944
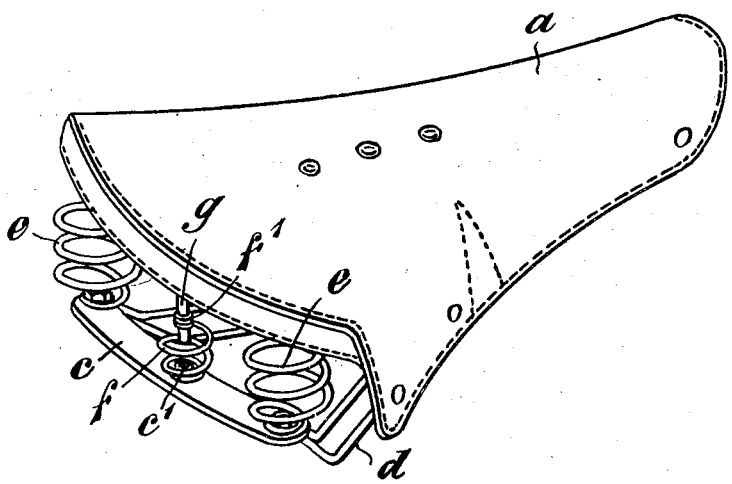
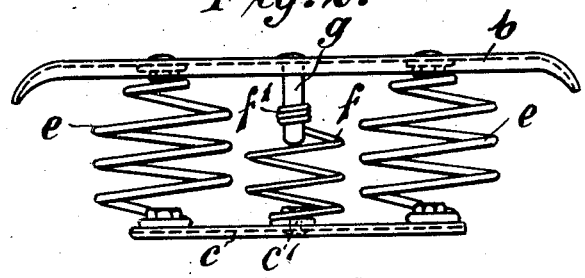
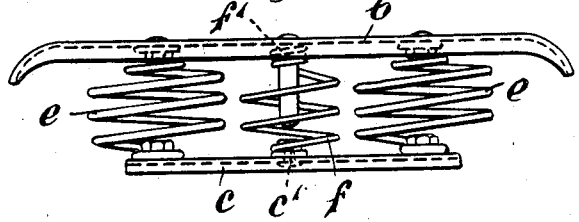
Inventor
Albert Victor Terry
by Marshall & Marshall
Attorneys Patented Nov. 15, 1949

2,487,904

UNITED STATES PATENT OFFICE 2,487,904

CYCLE SADDLE SPRING MOUNTING

Albert Victor Terry, Redditch, England

Application February 2, 1944, Serial No. 520,741
In Great Britain March 1, 1943

1 Claim. (Cl. 155—5.22)

This invention has reference to improvements in cycle saddles, and is more particularly applicable to cycle saddles of the kind wherein the seat or cover of the saddle is mounted on or forms part of a frame which is pivotally or resiliently mounted adjacent the peak of the saddle on a fixed underframe which is adapted to be clamped to the saddle pillar, coiled compression springs being interposed between the underside of the cantlebar of the pivotally mounted seat frame and the upper side of what may be termed the cantle or rear bar of the fixed underframe.

Saddles of this type may incorporate a plurality or series of substantially horizontally disposed coiled tension springs which constitute a resilient support for the seat of the saddle.

The object of the present invention is to provide more particularly in saddles of the kind referred to an auxiliary spring or springs subordinate to the ordinary coiled compression springs referred to which auxiliary spring or springs serve to automatically maintain a substantially even resilience or resilient support for the rider irrespective of his or her weight, whereby the one saddle can be utilised by riders of varying weights with an equal degree of riding comfort.

It has been proposed to achieve the objective by incorporating one or more auxiliary or additional coiled compression springs over and above the ordinary fixed coiled compression springs, which auxiliary or additional springs can be incorporated between or removed from points of connection and support at the rear of the saddle, said springs being located say intermediate a pair of fixed coiled compression springs, whereby a greater or lesser number of springs may constitute the resilient connection between the cantlebar of the pivotal seat frame and the rear end or bar of the fixed underframe or support. The present invention avoids the necessity for the use of removable auxiliary or additional springs, and admits of the one construction of saddle being stocked and utilised for riders of different weights.

The invention consists of a cycle saddle wherein there is combined with the ordinary fixed coiled compression springs which constitute the resilient mounting at the rear of the saddle, a subsidiary spring or springs interposed between the underside of the cantlebar of the seat frame and the upper side of the fixed underframe or support in such a manner that the cantlebar is normally out of contact with one end of the said subsidiary spring or springs and is only brought into contact or abutment therewith when a rider of average or more than average weight is seated on the saddle whereby compression is afforded to the said subsidiary spring or springs, which thus constitutes an additional spring resistance to the weight of the rider.

The invention further resides in the means whereby the said subsidiary spring or springs is or are mounted upon or connected to the cantlebar and the underframe or support of the saddle.

One means of carrying the present invention into practice will now be described and illustrated with particular reference to the accompanying drawings, in which:

Figure 1 is a perspective view looking from the rear end of a saddle showing the incorporation therein of the particular feature of the present invention.

Figure 2 is a rear end elevation of the saddle seen in Figure 1 with the cover thereof removed for clearness of observation.

Figure 3 is a similar elevation to that seen in Figure 2, but illustrating the position of the springs when a rider of relatively heavy weight is assumed to be seated on the saddle.

According to the illustrated embodiment of the invention the bicycle saddle comprises a saddle cover $a$, the rear end of which is maintained over a cantlebar $b$. The cantlebar $b$ has a downwardly directed flange along its rear edge over which is formed a part of the seat of the saddle. Vertically located and fixed between the upper cantlebar $b$ and the lower cantlebar $c$ which is secured to an underframe $d$ there is a pair of coiled compression springs $e$ which ordinarily form the resilient connection between the cantle bar $b$ and the cantlebar $c$ respectively.

The particular feature of the present invention resides in the provision of an additional but subsidiary coiled compression spring $f$, the lower end of which is formed into a loop and secured by a stud or bolt and nut $c^1$ projecting from the upper face of the lower cantlebar $c$. The upper end of this spring $f$ is loosely but snugly wound around and freely slidable upon a vertically dependent peg $g$ extending from the underface of the upper cantlebar $b$ forming part of the pivotal seat frame. The upper end of this subsidiary coiled compression spring $f$ which is reduced in diameter as indicated at $f^1$ and wound around the shank of the peg $g$ is located free from contact with the underside of the cantlebar $b$, so that it is not until the cantlebar $b$ has been moved downwardly through an amount determined by the weight or motion of the rider that the underside of the cantlebar $b$ is brought into contact with the uppermost reduced turn or coil $f^1$ of the subsidiary spring $f$; such a position is indicated by Figure 3 of the drawings. When such contact obtains then the additional resistance resulting from the introduction or incorporation of the subsidiary spring $f$ becomes effective and is added to that of the pair of fixed coiled compression springs $e$ between which the subsidiary spring is located, and it will be appreciated that if the weight of the rider is more than that of an average person there will then be a compression of all three springs $ee$ and $f$, and the resistance of the subsidiary spring $f$ is thus added to that of the rigidly fixed pair of springs $e$, and will thus serve to provide or incorporate an additional resilient element for the support of a heavy rider.

As a modification instead of slidably mounting the upper reduced turns $f^1$ of the subsidiary coil spring $f$ around the shank of the downwardly projecting peg $g$, the upper end of the subsidiary spring $f$ may be freely mounted below but clear of the underside of the cantlebar $b$ and only when a rider of average or more than average weight is seated on the saddle does the underside of the cantlebar $b$ of the pivotal seat frame make contact with the uppermost turn or coil of the freely projecting subsidiary spring $f$.

It will be appreciated that in such a construction the lower end or turn of the coiled subsidiary spring $f$ would require to be definitely secured to the lower cantlebar $c$ forming part of the fixed underframe $d$ or other support of the saddle. It will be obvious that instead of securing the base of the subsidiary spring $f$ to the under cantlebar $c$ that the arrangement could be inverted and the one end of the spring $f$ secured to the underside of the cantlebar $b$ and freely depend therefrom toward but normally out of contact with the upper face of the under cantlebar $c$ forming part of the fixed support or underframe for the saddle.

In every instance it will be appreciated that when a rider of light weight is seated on the saddle the subsidiary spring or springs $f$ would not be in use or effective, but that when say a rider of average weight was using the saddle then the full extension limit of the length of the spring $f$ could be made effective and contact established, while when a rider of more than average or heavy weight was using the saddle an initial degree of compression would result to all three of the springs $ee$ and $f$ from the outset, and thus a greater degree of compression resistance provided by the subsidiary spring or springs $f$ in combination with that of the fixed coiled springs $e$.

I claim:

A saddle for a cycle having a fore and aft extending main frame, said saddle comprising, in combination, a transversely extending planar base member, a shaped seat member having a rear portion extending substantially parallel to said base member, at least two transversely spaced helical main springs secured to said base member and to said seat member for supporting said seat member upon said base member, said main springs being spaced approximately equidistantly on opposite sides of the longitudinal center line of said saddle, a helical coil auxiliary spring having a length shorter than that of said main springs and secured at one end to one of said members and extending with its axis parallel to the axes of said main springs toward the other of said members, the coil of said auxiliary spring having its other end formed into a coaxial sleeve, and a guide pin mounted on the other of said members and extending coaxially into telescoping relationship with said sleeve.

ALBERT VICTOR TERRY.

REFERENCES CITED

The following references are of record in the file of this patent:

UNITED STATES PATENTS

| Number | Name | Date |
| --- | --- | --- |
| 401,179 | Lea | Apr. 9, 1889 |
| 790,717 | Brooks et al. | May 23, 1905 |
| 1,127,413 | Davis | Feb. 9, 1915 |
| 1,229,353 | Walker | June 12, 1917 |
| 1,397,685 | Hargood | Nov. 22, 1921 |
| 1,440,213 | Dubroy | Dec. 26, 1922 |
| 2,229,769 | Raders | Jan. 28, 1941 |

FOREIGN PATENTS

| Number | Country | Date |
| --- | --- | --- |
| 488,010 | Great Britain | June 29, 1938 |
| 341,916 | France | June 24, 1904 |
| 342,256 | Germany | Oct. 14, 1921 |
| 59,441 | Norway | May 30, 1938 |